March 12, 1929.                F. DE WILLY                1,705,396
ELECTRICAL WINDING
Filed April 20, 1926
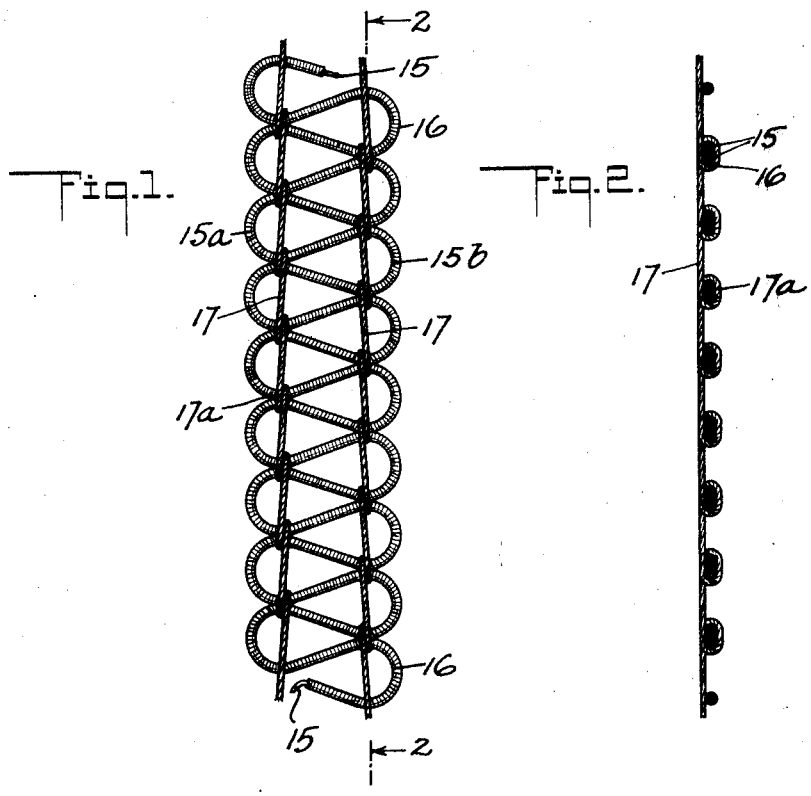
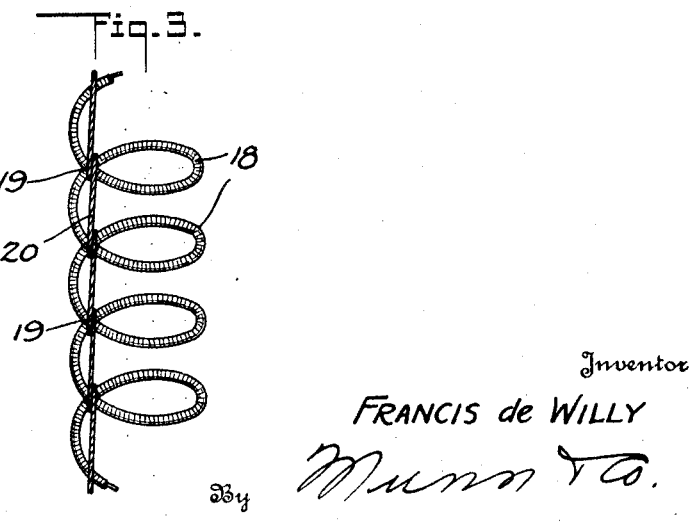
Inventor
FRANCIS de WILLY
By Munn & Co.
Attorney Patented Mar. 12, 1929.

1,705,396

UNITED STATES PATENT OFFICE.

FRANCIS DE WILLY, OF LOS ANGELES, CALIFORNIA.

ELECTRICAL WINDING.

Application filed April 20, 1926. Serial No. 103,380.

My invention relates to windings of the character disclosed in my patent Number 1,549,247, issued August 11, 1925, and referred to as retardation windings.

It is a purpose of my present invention to provide an electrical winding which is capable of general application to transformers, and radio frequency coils, and in various other capacities both in radio transmitting and receiving apparatus, and in its various uses it operates to produce what I believe to be a capacity or condenser effect which secures new and useful advantages in the transmission and reception of radiant energy.

More specifically, my invention has for its purpose the provision of a conducting wire wound so that when employed in any form of radio receiving circuit it functions to reduce to a minimum reradiation and interference from man-made and atmospheric static; greatly increases its selectivity and sensitivity, successfully aids in maintaining the allotted frequency of a broadcasting circuit; and in its adaptation to electrical and radio apparatus permits a greater length of wire to be used, as, for example, in radio frequency coils or transformers it allows an equal length of wire, substantially, to be used on the primary windings as on the secondary winding and yet the tuning of the coil will be as sharp, if not sharper, than where only a few feet of wire are used on the primary as is the present practice.

I will describe only two forms of windings embodying my invention, and will then point out the novel features thereof in claims.

In the drawings:

Figure 1 is a view showing in front elevation one form of winding embodying my invention;

Figure 2 is a vertical sectional view taken on the line 2—2 of Figure 1;

Figure 3 is a view showing in front elevation another form of winding embodying my invention.

Referring to Figures 1 and 2, I have here shown one embodiment of my invention which comprises a winding made from a single length of insulated wire 15 covered with suitable and relatively thin insulating material 16, such as silk thread. This wire 15 is bent by any suitable means and in a manner, broadly expressed, to have physical, but not electrical, contact with itself at different or spaced points along its length, with the intervening parts of the wire spaced from each other so as to produce air gaps therebetween. In the present instance I have shown the wire bent in first one direction and then the other to form a succession of loops 15ª and 15ᵇ, with adjacent loops disposed reversely to each other so that the base or narrow end of any one has physical contact with the wire portion of an adjacent loop. At these points of contact the several loops are attached or rather secured to each other by means of two threads 17 each of which is looped at intervals along its length as indicated at 17ª to embrace the wire loops at the points of contact, thereby securing the wire in the looped form. It is to be noted that the wire loops are secured in edge to edge relation so that the winding in its entirety assumes a substantially flat form, yet sufficiently flexible to permit of ready bending if it is desired to coil the winding as would be necessary in its use as the primary or secondary of a transformer or radio frequency coil.

In Figure 3 I have shown another embodiment of my invention which, although wound in a different manner, involves the same electrical principle of bending and securing an insulated wire in such manner as to have physical contact with itself at different points with the intervening parts spaced from each other. In this second form of winding the wire is coiled to form a succession of spaced loops 18 all disposed in the same plane, and the wire contacting with itself at one end of the loops as indicated at 19. The loops are secured in flat and spaced relation by a thread 20 which is looped in the same manner as the threads 17 so as to embrace the wire at its points of contact.

In either embodiment of my invention as well as in other forms of windings involving the same principle but not shown, I have found by experiment that when used as part of a transformer or radio frequency coil or even as a unit alone, but connected in a radio circuit, it secures the aforementioned as well as other new and useful advantages, all of which I believe at this time to be attributable to a capacity or condenser effect produced within the winding itself by virtue of the physical contacting of the wire with itself at spaced intervals and each point of contact setting up what I believe to be a condenser or capacity effect.

My invention is particularly adaptable, although not necessarily, to radio receiving circuits, and in such adaptation either as a part of the radio frequency coil or merely connected in the circuit in non-inductive relation to the other instruments, it functions to stabilize the circuit, prevent feed back improves the quality and increases the volume of the signal produced, and when incorporated in the primary or in primary and secondary of the radio frequency coil greatly reduces static and interference from reradiation from other radio sets and prevents sets whose units are connected with this form of wiring entirely from reradiating.

Although I have herein shown and described only two forms of electrical windings embodying my invention, it is to be understood that various changes and modifications may be made therein without departing from the spirit of the invention and the scope and spirit of the appended claims.

I claim:

1. An electrical winding adapted for use in radio broadcasting and receiving apparatus comprising a single length of insulated wire bent and secured to form flat and closed loops arranged one in advance of the other and in edge-to-edge relation so as to produce between adjacent loops a condenser effect in respect to current traversing the winding.

2. An electrical winding adapted for use in radio broadcasting and receiving apparatus comprising a single length of insulated wire bent and secured to form flat and closed loops arranged one in advance of the other and in edge-to-edge relation with adjacent loops reversely disposed and the narrow end of one loop in physical contact with the wide end of the other loop, whereby a condenser effect is produced in respect to current traversing the winding.

FRANCIS DE WILLY.